United States Patent [19]
Dent

[11] Patent Number: 5,940,742
[45] Date of Patent: Aug. 17, 1999

[54] TWO-WAY PAGING SYSTEM AND APPARATUS

[75] Inventor: Paul W. Dent, Stehags, Sweden

[73] Assignee: Ericsson Inc., Research Triangle Park, N.C.

[21] Appl. No.: 08/934,207

[22] Filed: Sep. 19, 1997

Related U.S. Application Data

[60] Division of application No. 08/402,947, Mar. 13, 1995, Pat. No. 5,708,971, which is a continuation-in-part of application No. 08/393,809, Feb. 24, 1995, Pat. No. 5,790,606, which is a continuation-in-part of application No. 08/179,953, Jan. 11, 1994, Pat. No. 5,619,503.

[51] Int. Cl.$^6$ .............................. H04B 7/00; H04Q 3/02; H04Q 9/14
[52] U.S. Cl. .......................................... 455/31.3; 455/562
[58] Field of Search .................................. 455/38.1, 31.3, 455/32.1, 561, 562, 67.1, 272, 12.1, 13.1; 340/825.44, 311.1

[56] References Cited

U.S. PATENT DOCUMENTS

| | | |
|---|---|---|
| 3,917,998 | 11/1975 | Welti . |
| 4,450,582 | 5/1984 | Russell . |
| 4,951,044 | 8/1990 | Nelson et al. . |
| 5,048,059 | 9/1991 | Dent . |
| 5,095,288 | 3/1992 | Dent . |
| 5,111,534 | 5/1992 | Benner . |
| 5,119,504 | 6/1992 | Durboraw, III . |
| 5,151,919 | 9/1992 | Dent . |
| 5,161,248 | 11/1992 | Bertiger et al. . |
| 5,180,993 | 1/1993 | Dent . |
| 5,191,594 | 3/1993 | Argo et al. . |
| 5,241,702 | 8/1993 | Dent . |
| 5,249,181 | 9/1993 | Wang et al. . |
| 5,303,393 | 4/1994 | Noreen et al. . |
| 5,343,512 | 8/1994 | Wang et al. . |
| 5,363,428 | 11/1994 | Nagashima . |
| 5,530,722 | 6/1996 | Dent . |

FOREIGN PATENT DOCUMENTS

| | | |
|---|---|---|
| 501 717 | 9/1992 | European Pat. Off. . |
| 520 969 | 12/1992 | European Pat. Off. . |
| WO90/00277 | 1/1990 | WIPO . |
| WO91/18458 | 11/1991 | WIPO . |

OTHER PUBLICATIONS

Zvonar et al., "Optimum Multiuser Detection in Single–Path Raleigh Fading Channels", 29$^{th}$ *Allerton Conference on Communication, Control and Computing,* pp. 390–399, Oct. 1991.

Zvonar et al., "On Multiuser Detection in Asynchronous CDMA Flat Rayleigh Fading Channels", *PIMRC,* pertinent pages, 1992.

Zvonar et al., "A Comparison of Differentially Coherent and Coherent Multiuser Detection with Imperfect Phase Estimates in Rayleigh Fading Channel", *It,* pertinent page, 1993.

Zvonar et al., "Adaptive Multiuser Receiver for Fading CDMA Channels with Severe ISI", *Proceedings of Conference on Information Sciences and Systems,* pertinent pages, Mar. 1993.

(List continued on next page.)

*Primary Examiner*—Nguyen Vo
*Attorney, Agent, or Firm*—Burns, Doane, Swecker & Mathis, L.L.P.

[57] ABSTRACT

Paging systems typically include a network of ground stations or orbiting satellites equipped with transmitters and antennas for transmitting paging messages to small, battery-operated paging receivers that are worn about the person, known as pagers. Conventional pagers are receive-only devices and the network receives no confirmation that paging has been successful. The present invention includes the provision of two-way pagers that contain a transmitter for transmitting an acknowledgment confirming reception of a paging message, and a network of receiving stations able to receive said acknowledgments. The network makes use of advanced phased-array antenna signal processing techniques to render the return link operable with much less transmitter power in the portable unit than employed by the base station.

13 Claims, 9 Drawing Sheets

OTHER PUBLICATIONS

Xie, "Joint Signal Detection and Parameter Estimation in Multiuser Communications", *IEEE Transactions on Communications,* vol. 41, No. 7, pp. 1208–1216, Aug. 1993.

Yoon, "A Spread–Spectrum Multiaccess System with Cochannel Interference Cancellation for Multipath Fading Channels", *IEEE Journal on Selected Areas on Communications,* vol. 11, No. 7, pp. 1067–1075, Sep. 1993

Kajiwara, "On Synchronous CDMA for Mobile Communications", *IEEE Globecom.,* pp. 858–862, 1992.

Zvonar et al., "Optimum Detection in Asynchronous Multiple–Access Multipath Rayleigh Fading Channels", *26th Annual Conference on Info. Sciences & Systems,* Princeton University, pertinent pages, Mar. 1992.

Zvonar et al., "Suboptimum Multiuser Detector for Synchronous CDMA Frequency–Selective Rayleigh Fading Channels", *CTMC,* pertinent pages, 1992.

Zvonar et al., "Coherent and Differentially Coherent Multiuser Detectors for Asynchronous CDMA Frequency–Selective Channels", *IEEE Milcom,* pp. 0442–0446, 1992.

Verdu, "Minimum Probability of Error for Asynchronous Gaussian Multiple–Access Channels", *IEEE Transactions on Information Theory,* vol. IT–32, No. 1, pp. 85–96, Jan. 1986.

Lupas et al., "Linear Multiuser Detectors for Synchronous Code–Division Multiple–Access Channels", *IEEE Transactions on Information Theory,* vol. 35, No. 1, pp. 123–136, Jan. 1989.

Lupas et al., "Near–Far Resistance of Multiuser Detectors in Asynchronous Channels", *IEEE Transactions on Communications,* vol. 38, No. 4, pp. 496–508, 1990.

Wijayasuriya et al., "A Near–Far Resistance Sliding Window Decorrelating Algorithm for Multi–User Detectors in DS–CDMA Systems", *IEE Globecom,* pp. 1331–1338, 1992.

Wijayasuriya et al., "Rake Decorrelating Receiver for DS–CDMA Mobile Radio Networks", *Electronics Letters,* vol. 29, No. 4, pp. 395–396, Feb. 1993.

Wijayasuriya et al., "Rake Decorrelation as an Alternative to Rapid Power Control in DS–CDMA Mobile Radio", *IEEE,* pp. 368–371, 1993.

Zie et al., "A Family of Suboptimum Detectors for Coherent Multiuser Communications", *IEEE Journal on Selected Areas in Communications,* IEEE Journal on Selected Areas in Communications, *vol. 8, No. 4, May, 1990.*

Ungerboeck, "Adaptive Maximum–Likelihood Receiver for Carrier–Modulated Data–Transmission Systems", *IEEE Transactions on Communications,* vol. COM–22, No. 5, pp. 624–636, May, 1974.

Kummer, "Basic Array Theory", *Proceedings of the IEEE,* vol. 80, No. 1, pp. 127–140, Jan. 1992.

Gabriel, "Adaptive Processing Array Systems", *Proceedings of the IEEE,* vol. 80, No. 1, pp. 152–162, Jan. 1992.

Anderson et al., "An adaptive Array for Mobile Communication Systems", *IEEE Transactions on Vehicular Technology,* vol. 40, No. 1, pp. 230–236, Feb. 1991.

Dilsavor et al., Analysis of Modified SMI Method for Adaptive Array Weight Control, *IEEE Transactions on Signal Processing,* vol. 41, No. 2, pp. 721–726, Feb. 1993.

"Request for Pioneer's Preference", Filed May 4, 1992, FCC, Washington, D.C., 24 pages, Docket No. 9–314.

"Appendix to Request of Spatial Communications, Inc. for a Pioneer's Preference in Licensing Process for Personal Communications Services", May 4, 1992.

Craig et al., "Final Report of Study on Digital Beamforming Networks", British Aerospace Ltd., 28 pages, Jul. 1990.

Cooper et al., "SDMA Technology Overview and Development Status", pp. 1–16, Sep. 1992.

Abbott, "Requirements of a Mobile Satellite Service" Skylink Corp., pp. 212–215.

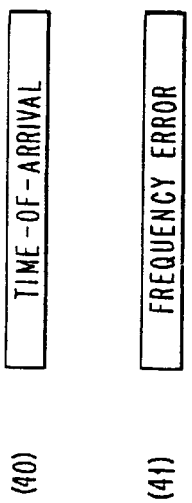
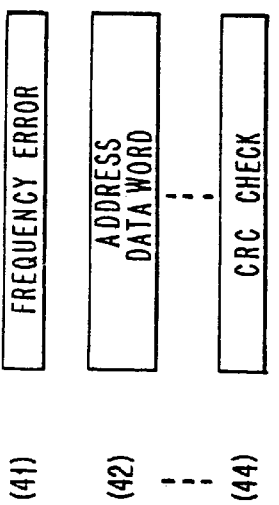
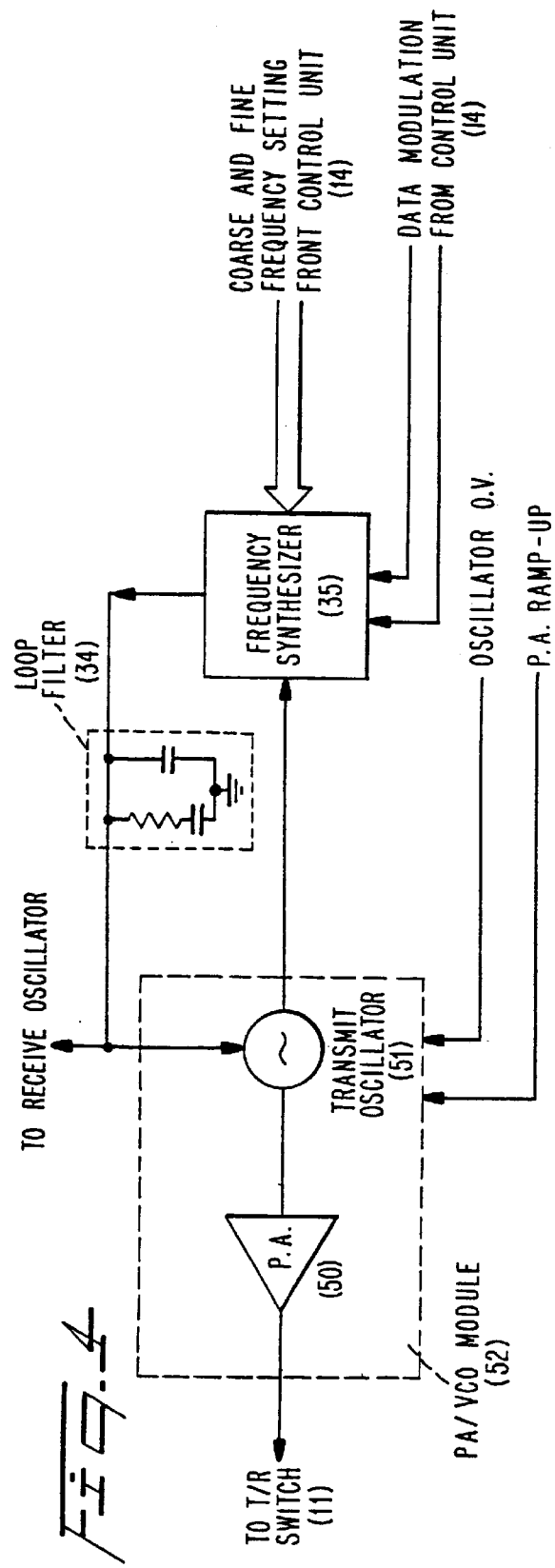

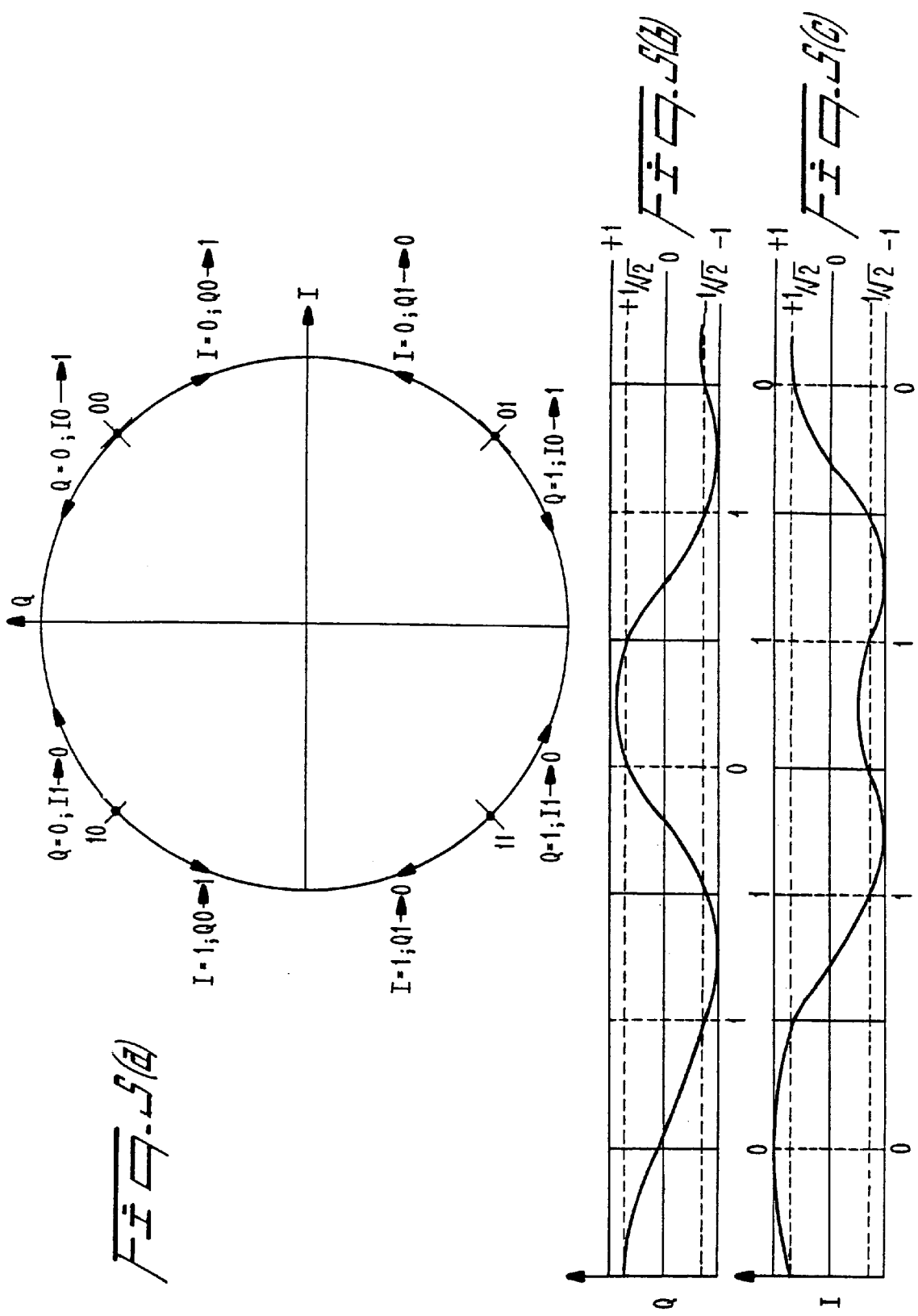

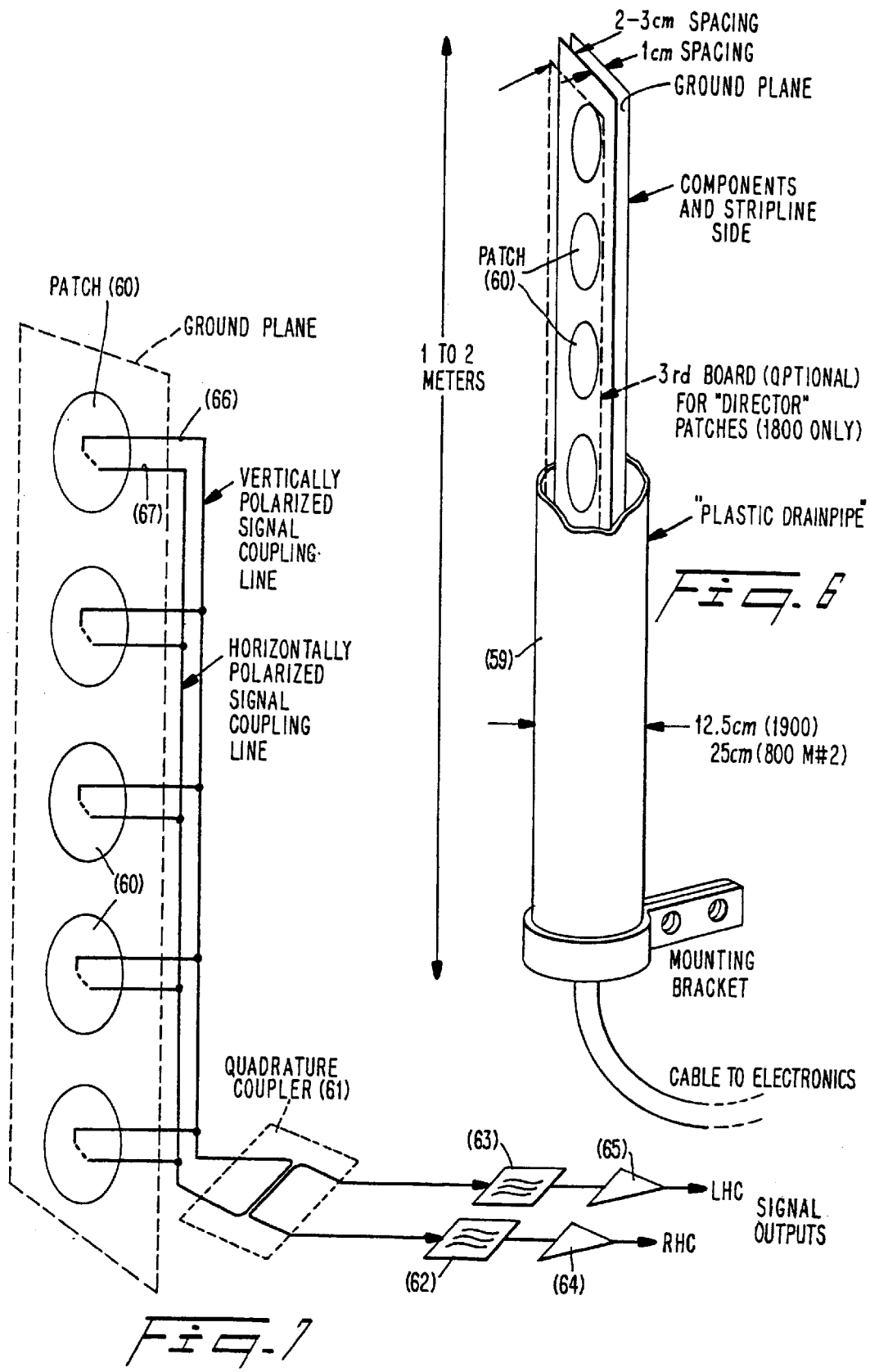

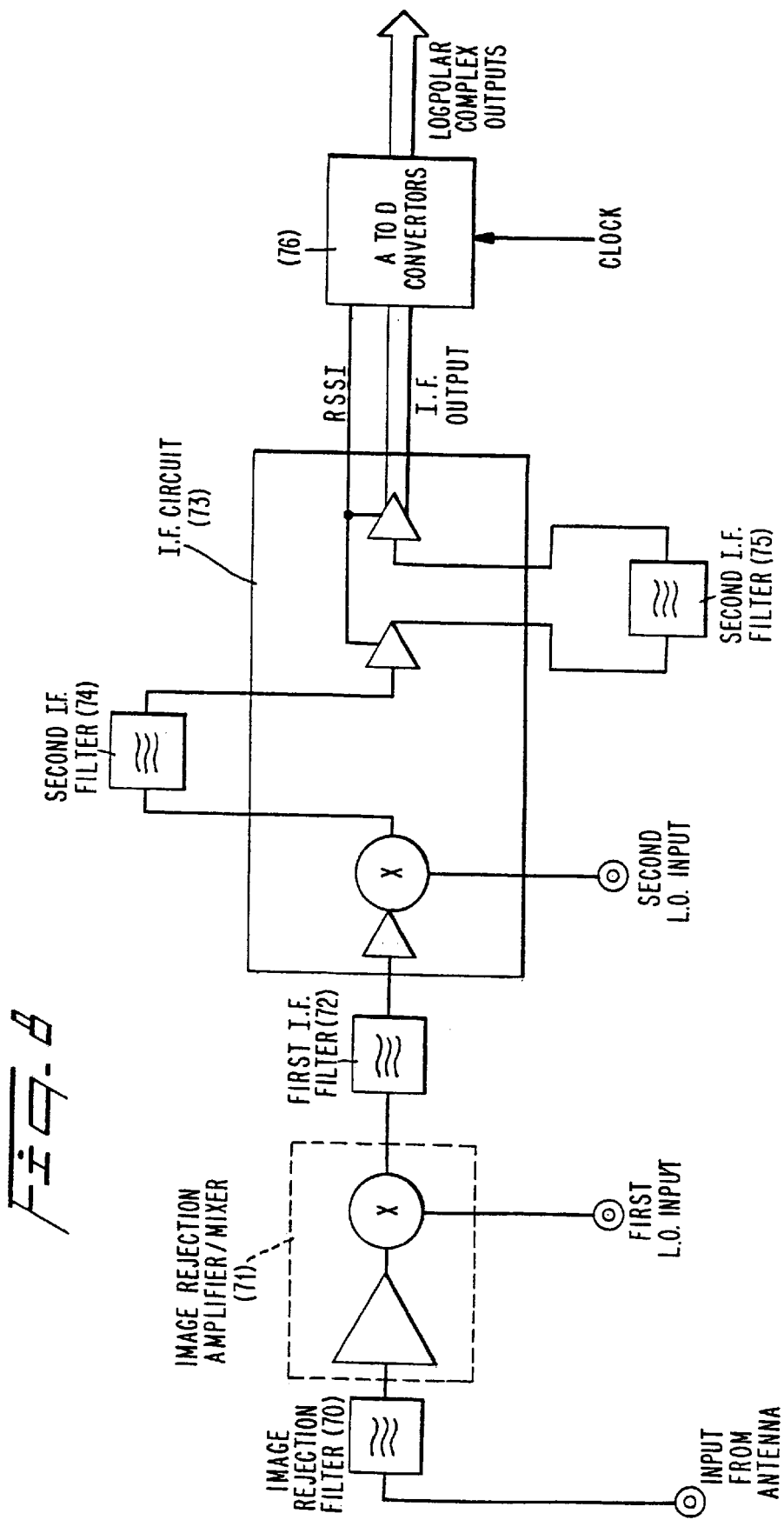

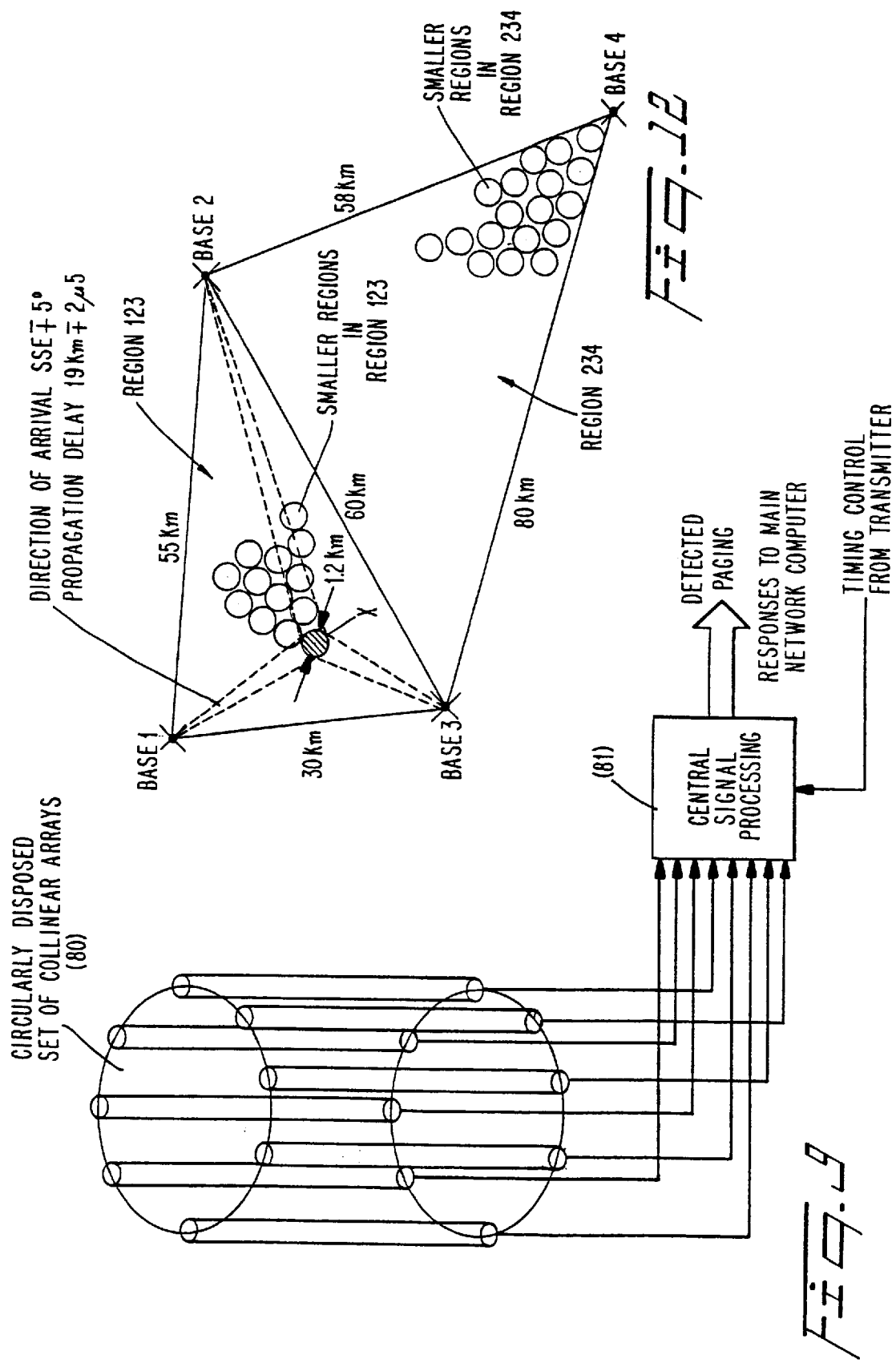

TWO-WAY PAGING SYSTEM AND APPARATUS

This application is a continuation of application Ser. No. 08/402,947, filed Mar. 13, 1995 now U.S. Pat. No. 5,708,971, which is a continuation-in-part of application Ser. No. 08/393,809, filed Feb. 24, 1995, now U.S. Pat. No. 5,790,606 which is a continuation-in-part of application Ser. No. 08/179,953, filed Jan. 11, 1994, now U.S. Pat. No. 5,614,503.

BACKGROUND

The present invention relates to systems for electronically alerting people using portable devices and transmitting short messages to those devices, for example a telephone number that should be called. This field of one-way radio communications of short messages is known as paging.

Conventional paging systems are one-way communications systems in which the portable unit consists of only a receiver. Paging services are, however, facing increasing competition from two-way cellular phone systems, as the latest cellular phones are small, of low cost, and offer long battery life and voice communications. The paging services market is therefore responding to competition by expressing an interest in moving towards two-way communications services, such as short message services or voice mailboxes in the network, which services have to be triggered to replay the centrally stored message by the paging unit, thereby necessitating communication in the reverse direction, i.e., from the paging unit to the network.

However, there are many technical problems in providing reverse communication from a paging unit to a base station. Paging broadcast transmitters are typically of high power, for example 100 to 250 watts, in order to compensate for the low efficiency of the paging receiver antenna which is usually worn close to the user's body. The provision of capability for pagers to communicate in the reverse direction is thus seriously impeded by the need for a similarly high transmitter power to close the link in the reverse direction.

Conventional systems do exist which provide two-way radio communication from a portable unit back to a base unit with much lower portable transmitter power than used in the forward, i.e. base-to-portable, direction. A landmobile radio system such as the EDACS system manufactured by Ericsson Inc. in Lynchburg, Va. is an example of such a system. In these conventional systems, the reverse link is closed by providing multiple, distributed, base station receiving sites so that the range from a portable unit to the nearest receiving site is much less than the range from the base transmitter to the portable, thus allowing the portable transmitter power to be much lower than the base transmitter power. However, the provision of multiple receiver sites can be costly.

Conventional systems also contain examples of two-way communications from a portable unit to a base unit using lower power than that used in the forward direction, and without using a much greater number of fixed receiver sites than fixed transmitter sites. A cellular phone system is an example of such a system. Each site, known as a cell-site, comprises at least one transmitter and at least one receiver. All sites are thus both transmitter sites and receiver sites. To allow the portable unit to employ lower power than the base unit while communicating over the same distance, the fixed receiving system often provides spatial-diversity reception by using two, spaced-apart receiving antennas. This provides a gain of 7 dB when signals are subject to Rayleigh fading, allowing the portable unit power to be, in principle, five times lower than the base power.

Conventional cellular systems also include the use of directional antennas at the base station. Typically, the base station antenna includes three directional antennas placed around a mast at 120 degree intervals and each covering three 120 degree sectors or cells. A sectorized cellular system can be regarded as having collected together the base sites of three adjoining cells, the cells then being illuminated from their common edge instead of their separate centers, thus reducing the number of sites by three to save real estate costs. The extra communications distance that the base must serve, i.e. from cell edge to cell edge instead of center-to-edge, is accommodated by the extra directive gain of the 120-degree sector antenna as compared to the omni-directional antenna that would be used in the case of central illumination. Sectorization in cellular systems is therefore a way of providing the same performance with reduced real estate costs.

The antenna direction or sector to be used for serving a particular mobile phone is determined at call set-up time and adequate time is available to establish the sector to be used, due to the relatively long duration of a telephone call. The same antenna direction is used for transmission as well as for reception in cellular systems. This solution does not, however, function for a paging system which broadcasts a paging message over the full 360 degree azimuth in which a portable unit may be located and which system does not know in advance what antenna direction to use either for transmission or reception. In a paging system, messages are typically too short to execute a call set-up procedure similar to that employed in making a cellular telephone call, and which enable antenna directivity to be properly selected to serve the call.

The above-incorporated by reference parent patent applications disclose ways and systems to enhance reception antenna directivity by the use of antenna arrays. The parent applications also disclose employing known symbol patterns transmitted by mobile transmitters at the base receiver site in order to determine the optimum coefficients with which signals from the antenna elements can be combined to enhance reception. Moreover, these applications also describe using signals received to determine phase and amplitude errors between array elements and to correct same on a long-term basis. These techniques are further developed below to overcome the deficiencies of conventional paging systems that hinder implementation of a two-way paging system.

SUMMARY

These, and other, drawbacks, limitations and problems are overcome by way of the present invention, which has as one objective to reduce the need for multiple receiver sites while still allowing a great reduction in portable unit transmit power. Two-way paging systems according to exemplary embodiments of the present invention include small, portable, battery-powered paging units each having a receiver section, a transmitter section and a control section. The control section has a low-power timer that controls powering up and down of the receiver such that the receiver is only active for a low percentage of the time to conserve battery power. When powered up, the receiver receives a signal and processes it to decode an address. Upon successfully decoding an address, a receive timing indication is output to the control section which in turn activates the transmitter to generate an acknowledgment signal having a certain timing relative to the receive timing. The acknowledgment signal can, for example, be a cyclic redundancy check (CRC) code calculated from the received message bits, but can also provide an indication that further information follows.

Paging networks according to the present invention include a network of receiver sites that may be collocated with or separated from the paging transmitter sites. The receiving sites can each include an array of elementary directive antennas whose signals can be jointly processed to increase probability of reception. Signals from the antenna elements are sampled at certain times after transmission of a paging message in order to capture an acknowledgment signal. If the same frequency is employed for reception as for transmission, the base transmitters can be inhibited during the receive timing window.

The sampled signals are digitized and stored in a memory and then processed by a numerical processor to attempt detection of the acknowledgment. For example, the processor can evaluate different hypotheses of where in the storage medium samples corresponding to the start of the acknowledgment lie (i.e., time of arrival hypotheses); different hypotheses of direction from which the acknowledgment was received (i.e., direction of arrival hypotheses), and different hypotheses of the radio frequency on which the acknowledgment was transmitted (i.e., frequency hypotheses). As an alternative to frequency hypothesis, frequency inaccuracies in the portable pager device can be avoided by correcting for the frequency using a frequency error measured on the signal received by the paging receiver.

BRIEF DESCRIPTION OF THE DRAWINGS

These, and other, features, objects and advantages of the present invention will be more readily understood upon reading the following detailed description in conjunction with the drawings in which:

FIG. 3 illustrates an exemplary decoded data format according to an exemplary embodiment of the present invention;

FIG. 4 is a block diagram of a transmitter according to an exemplary embodiment of the present invention;

FIG. 5(a) illustrates an exemplary radio signal's complex vector representation according to a constant envelope OQPSK embodiment of the present invention;

FIG. 5(b) illustrates an exemplary Q component waveform;

FIG. 5(c) illustrates an exemplary I component waveform;

FIG. 6 depicts an exemplary antenna construction;

FIG. 7 shows exemplary connections for the patches of the antenna of FIG. 6;

FIG. 8 is a block diagram representation of a base station's signal processing channel for received signals according to an exemplary embodiment of the present invention;

FIG. 9 shows a circular array and common array processing according to an exemplary embodiment of the present invention;

FIG. 12 illustrates an example of sectorized processing according to an exemplary embodiment of the present invention.

DETAILED DESCRIPTION

Figure 1:
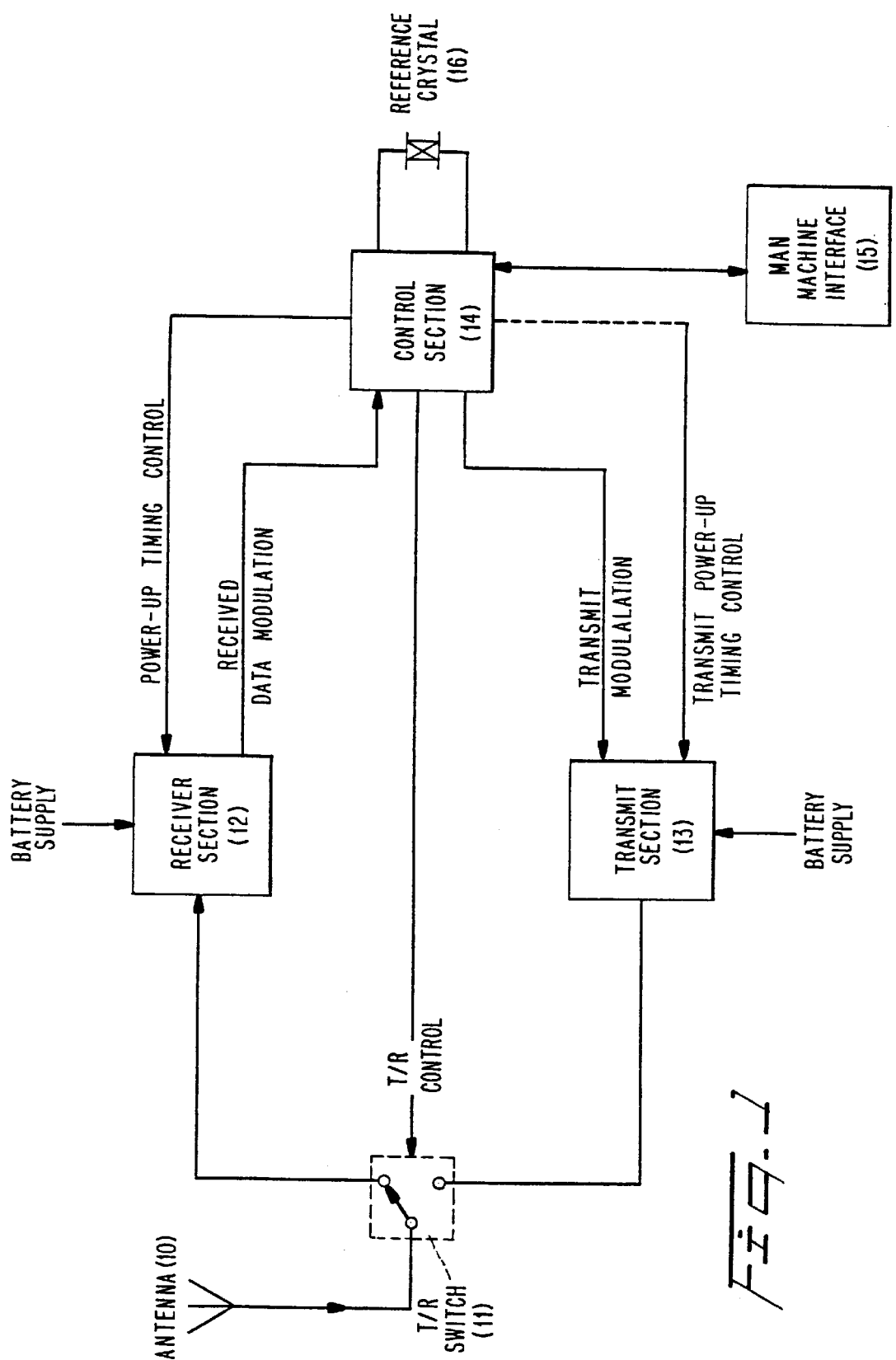
FIG. 1 is a general block diagram of a pager according to an exemplary embodiment of the present invention.

A general exemplary schematic of a pager for implementing the present invention is shown in FIG. 1. An antenna 10 is coupled alternatively to a receiver section 12 or a transmitter section 13 via a transmit-receive antenna switch 11. The switch 11 may be constructed, for example, using PIN diodes and known techniques whereby the PIN diodes consume no current except when the unit is placed in the transmit mode. It is alternatively possible to arrange that the PIN diodes do not take current from the battery except when the transmitter or receiver are operated.

It will be appreciated that a significant design issue in pagers is the minimization of battery consumption when the pagers are in standby mode. To this end, pagers and paging networks are designed to not require continuous reception by the portable unit, but cooperate to define a time slot in a repetitive frame period in which pages to a particular pager would always be transmitted. The pager can then power down its receiver or enter a "sleep mode" for the majority of the frame period in order to conserve battery energy. The only circuitry that remains active in the sleep mode is a low-power timer driven by a low-current oscillator that determines when the pager will wake up to examine the paging station's transmissions for a possible message containing its address. This timer (not shown in FIG. 1) is provided in control section 14 which issues power-up control signals to either the receiver or transmitter circuits when required.

When the receiver 12 or transmitter 13 is to be activated, the frequency accuracy needed to ensure that the receiver or transmitter functions on the correct radio channel frequency is usually higher than the low-power timing oscillator in control section 14 can provide. Such low-power oscillators, similar to those used in electronic wristwatch chips, generally employ a 32 KHz crystal with an accuracy of a few parts in 100,000. At a transmitter or receiver operating frequency of 500–1000 MHz, however, this translates to a frequency inaccuracy of many 10's of kilohertz, which is typically unacceptable. To obtain acceptable radio frequency accuracy, it is generally necessary to employ a higher frequency crystal, in the 10 MHz region, which has a particular angle of cut designed to ensure high temperature stability, i.e., an AT-cut crystal. Such an oscillator however consumes an undesirably high current from the battery on continuous duty and ideally should itself be powered down except during transmission or reception. When powered up, such a high stability oscillator can, moreover, take several tens of milliseconds to reach a stable operating condition due to the high Q factor of the high-stability crystal. Instead, a low-power standby timer system which operates without using an external 32 KHz crystal and which issues a pre-power-up command to the high stability oscillator prior to powering up the rest of the receiver, in order to give the oscillation time to stabilize can be provided. Moreover, the low-accuracy, non-crystal oscillator, which can be entirely constructed on an integrated circuit chip, is calibrated against the high-accuracy oscillator 16 at every power-up opportunity so that the number of counts the timer must count to the next power-up period can be recalculated.

The control section 14 also connects to a Man-Machine Interface (MMI) 15. MMI is a general term used for earphones, microphones, buzzers, displays and keyboards that enable the human user to interact with an electronic or mechanical device. Typically, a pager MMI comprises a beeper, a display and one or two key buttons. The display can show a telephone number that the user is being paged to call, or even display longer text messages that the user can scroll through with the help of, for example, right/left or up/down buttons.

According to the present invention, the control section 14 also has an interface with transmit section 13. When the control section detects its address in its receive timeslot and receives a message, the control section electronically assembles an acknowledgment or pre-prepared reply and activates the transmitter section 13 to transmit the reply. To ease the base receiver's task of detecting the reply, the control unit preferably causes transmission of the reply at a predetermined time delay after receipt of the paging message. The predetermined time delay need be no more than the time the receiver needs to verify its address after receiving the last message bit, plus the time needed to tune the transmitter onto frequency, for example 2 milliseconds to 10 milliseconds.

It is also possible for the pager to initiate transmission of a short message without having been paged according to the present invention. In this case, control section 14 activates the transmitter section 13 at a predetermined time after receiving a message in the pager's own timing slot whether or not the paging slot contained the pager's address. The pager may be permitted to transmit its own message at a time when another pager may be responding, or alternatively such pager-initiated transmissions can be permitted only when the receiving slot contained an idle indication. Moreover, a separate receiving frequency channel can be provided at the base station with corresponding alternative transmit channels at the paging unit for sending respectively an acknowledgment to a paging message or a self-initiated message that was not in response to detection of the pager's own address. Another system option is to use the alternative frequency channel for transmitting self-initiated messages only when the receive timeslot contains the address of a different pager, and to use the primary reverse channel frequency when the receive timeslot contains an idle indication. The base network can respond with an acknowledgment of receipt of such a self-initiated message and the pager, upon non-receipt of an acknowledgment, can continue to repeat transmissions until successful.

Yet another system option facilitated according to the present invention includes using the same frequency for forward and return links. By arranging paging units to respond with relatively precise transmit burst timing relative to a timing marker received from the base station, the network can shut off its transmitters during the expected reply window in order to receive the low-power responses from pagers. AlR of the foregoing alternatives are considered to be within the scope and spirit of the present invention as specified by the attached claims.

Figure 2:
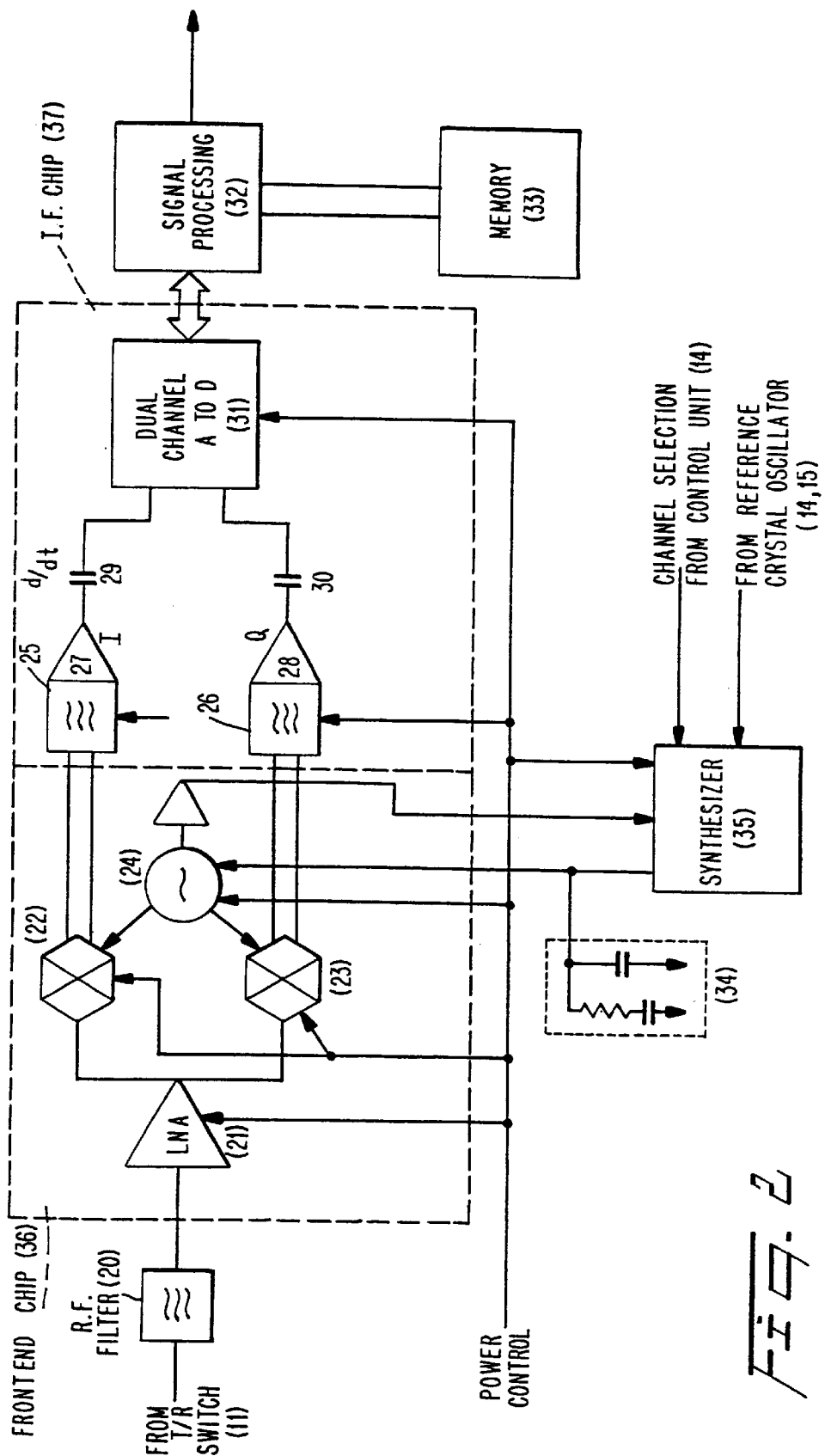
FIG. 2 is a block diagram of a receiver according to an exemplary embodiment of the present invention.

FIG. 2 shows more details of the preferred paging receiver implementation in the portable unit. The received signal from T/R switch 11 enters through an antenna filter 20 which excludes strong, out-of-band, interfering signals. The filtered signal enters a low-noise amplifier 21 and quadrature downconvertors 22 and 23 where the amplified signal is mixed with cosine and sine signals from quadrature oscillator 24 controlled by frequency synthesizer 35. Integrated circuit chips can be made which perform all of the so-called "front-end functions", i.e. those performed by elements 21, 22, 23 and 24, in a single chip.

The output of the front-end chip comprises two baseband signals known as I and Q. The I,Q signals are low-pass filtered in active filters 25 and 26 and amplified in baseband amplifiers 27 and 28. At this point in the processing the amount of amplification required is not known as signals can be received by the pager anywhere over a wide dynamic range. However, the amount of amplification should be limited to avoid a signal strong enough to cause saturation. Moreover, since the receiver depicted in FIG. 2 is a homodyne receiver, it suffers from high DC offset on the outputs of mixers 22 and 23 and amplifiers 27 and 28 which further limits the amount of amplification which can be used without saturation. These offsets arise not only from practical circuit imbalances but also from the receiver receiving a signal from its own local oscillator 24, which, in a homodyne receiver, is typically in the center of the desired receive frequency channel, giving rise to coherent interference. The problem of DC offset can be alleviated as described in U.S. Pat. No. 5,241,702 to Paul W. Dent entitled "DC offset Compensation" which is incorporated here by reference. As discussed in more detail in this patent, the troublesome DC offsets are removed by differentiating the I,Q signals using capacitors 29 and 30 and then digitizing the differentiated I,Q signals using dual-channel AtoD convertor 31. An AtoD conversion technique can be used which employs companded delta modulation, which encompasses the differentiation of the I,Q signals.

The differentiated and digitized I,Q signals are passed from AtoD convertor 31 to digital signal processing unit 32 which can form part of the same CMOS integrated circuit as used to realize control section 14. The signal processing unit may store the digitized and differentiated I,Q signals in memory 33 and then recall those signals for off-line processing. Each sample stored would however have been received at an accurately known instant relative to a master clock in control unit 14 driven by reference crystal oscillator 16, which master clock controls the starting instant of AtoD convertor 31 for digitizing samples. Thus off-line signal processing does not entail a loss of knowledge of the signal's real-time behavior. This knowledge is preserved in order to be able to trigger transmitter 13 to transmit a reply at a certain time after a specific symbol or signal pattern was detected in the received message.

Signal processing 32 typically includes reintegrating the digitized I,Q signals to restore their original characteristics using I and Q digital accumulators which are initially set to zero. The signal processing may also include estimating an offset error in the re-integrated signals and compensating for the offset error according to U.S Pat. No. 5,241,702 incorporated above. In addition, a systematic upward or downward slope in the reintegrated signals may be compensated. The compensated signals are then digitally demodulated to extract the transmitted digital data, the data having been impressed by any known digital modulation technique such as binary FM, MSK, GMSK, PSK, QPSK, OQPSK, Pi/4-DQPSK, QAM or other technique.

After processing the received signal as described above, the decoded data may be stored in memory with a format such as that shown in FIG. 3. There a time-of-arrival word 40 indicates the sample number in the memory buffer 33 that was deemed to contain the start of a particular bit in the received message. This might suitably be the first bit of the address component 42, for example, in its coded form. The address in coded form might include a greater number of bits than the address in its decoded form due to the use of an error correction code for transmission which expands the number of bits by adding redundancy. Moreover, the expanded number of coded bits can be interleaved and transmitted in non-time-sequential order in order to provide protection against fading or non-Gaussian noise. Nevertheless the transmit format (including the interleaving format)

is known a-priori to the receiver so that the first coded bit of the address can be located in the received signal sample stream. The time-of-arrival word 40 indicates the time, in terms of sample count, after the start of AtoD converting the signal as triggered by control section 14, at which the designated marker in the message was detected. Meanwhile, the real-time counter in the control section 14 continues to increment, so that the count which will be reached at a given time after this marker was received can be computed by adding the time-of-arrival word to the counter starting state and adding the predetermined delay after receipt of the marker at which transmission is to occur. The result is compared with the rolling counter and when a match is obtained, the transmitter is activated to transmit the acknowledgment.

FIG. 3 indicates that the memory also contains a frequency error word 41. This is a value produced by the data demodulator which is used in the demodulation algorithm to compensate for frequency error between the frequency transmitted by the base station and the portable unit's frequency reference. For example, this value can represent the phase drift per bit as computed over the received, coded message bits. This error value can be used to correct the output frequency of the portable unit's reference oscillator before the transmission of the acknowledgment by the transmitter section 13. In exemplary implementations, the frequency error word is used, at each receive opportunity, to update a correction value that is applied to reference oscillator 16, for example with the aid of a D to A convertor controlling a varactor diode (not shown) across the crystal. If, however, significant frequency changes are expected after each receive opportunity, as may occur if sleep periods were several minutes long instead of just seconds or fractions of a second, then the correction assessed on the receive opportunity should be immediately applied before transmission, and this can be effected by predistorting the transmit signal frequency in the necessary direction, using for example a fractional-N transmit frequency synthesizer having five frequency steps.

The rest of the memory format of FIG. 3 contains the received message, including an address 42 which is compared to the pager's own address, some other data 43, for example a telephone number to be called, and a CRC check code 44. The CRC check code 44 is a number of bits computed at the transmitter in dependence on the address and other data bits and is recomputed at the receiver in the same way. If the recomputed version matches the decoded, stored version 44, then the message is deemed to have been correctly decoded. If a correctly decoded message contains the pager's own address, then an acknowledgment will be transmitted with the transmit timing based on the time-of-arrival word 40.

FIG. 4 shows a block diagram of an exemplary transmitter for implementing the present invention. A transmit power amplifier 50 is driven by a transmit oscillator 51 controlled by synthesizer 35, which can be, for economy, the same frequency synthesizer chip as used for the receiver section 12. The power amplifier 50 and transmit oscillator 51 can be packaged as a single module 52. The transmit oscillator signal is applied to the frequency synthesis chip 35 rather than the receive oscillator signal for transmitter purposes. Although this connection is illustrated only generally in FIG. 4, i.e., by an arrow extending from transmit oscillator 51 to frequency synthesizer 35, it could, for example, comprise two inputs on the synthesizer chip 35 (i.e., one for the receive oscillator signal and one for the transmit oscillator signal) of which only one is active at a time.

Alternatively, a switch such as the T/R switch 11 can be used to switch signals into the synthesizer 35, or the transmit oscillator signal can be routed through a buffer in the receive chip 36 which would select the receive oscillator 24 to be routed to synthesizer chip 35 in reception mode and the transmit oscillator 51 to be routed to the synthesizer during transmit mode. Preferably, receive functions 36, transmit functions 52 and T/R switch 11 are all integrated in a combined transmit/receive chip thus avoiding the pin connections associated with the signal routing between them. A loop filter 34 is provided to reduce spurious signals on the VCO control line while permitting rapid retuning of the synthesizer between receive and transmit frequencies. Such a synthesizer is described in U.S. Pat. No. 5,180,993 which is incorporated here by reference.

The transmit frequency allocated to the pager can differ from the receive frequency. The acknowledgment frequency channel may even be in a different frequency band, for example UHF for receive and VHF for transmit. Nevertheless the synthesizer chip 35 is sufficiently flexible to be programmed to control a transmit frequency that is substantially different from the receive frequency.

In switching from controlling the receive frequency to controlling the transmit frequency, however, a certain time is allowed for reprogramming the synthesizer and allowing the newly controlled oscillator frequency to settle on the desired frequency. A fast settling time may be obtained using, for example, the techniques described in U.S. Pat. Nos. 5,095,288 and 5,180,933 which are incorporated here by reference and these techniques are embodied in the UM1005 synthesizer chip manufactured and sold by the Philips company. A fast settling time is useful in minimizing the aforesaid delay between receive and transmit modes during which time energy is being drained from the battery.

Another factor in determining the delay between reception of a signal addressed to a pager and transmitting the acknowledgment, is the signal processing delay and the time needed by the receiver to check the CRC and verify that its own address is part of the received message. Hard-wired logic to perform these functions is preferable from both the power consumption and time delay viewpoint, but alternatively they may be performed by a programmable digital signal processor or microprocessor equipped with a suitable program.

The transmitter activation sequence after detection by the receiver of a valid message may thus include, for example:

Activation of the transmit oscillator;

Transfer of the synthesizer control function from receive to transmit;

Switching the antenna from the receiver to the transmitter;

Ramping up the transmit power from zero to maximum;

Waiting to allow the ramp-up transient and the synthesizer to settle;

Applying data modulation to the transmit signal;

Ramping down the transmit power from maximum to zero;

Switching the antenna from transmit to receive;

Switching the oscillator off;

Switching the synthesizer, and reference oscillator off and returning all circuits to sleep mode.

In the above sequence, the period of high power during which data modulation is applied to the transmitter should be as short as necessary to convey a useful number of information bits within the bandwidth available. The data transmission period should in any case be less than 1 mS for a transmit frequency in the 1 GHz region to avoid significant changes in propagation path phase or amplitude over the transmit period caused by fast fading when the pager is being transported at speeds of up to 100 kM/Hr. Assuming a 25 KHz channel bandwidth, a bitrate of around 32 KB/S can be supported by using a spectrally efficient binary digital modulation such as Offset QPSK, thus permitting a 32-bit acknowledgment to be sent. This can be a rate ½, block-coded version of a CRC check computed over the received message, which will verify to the base that the message was received correctly. Moreover, there is only a 1 in 65536 chance that noise received at the base receiver would be interpreted incorrectly as receipt of an acknowledgment. It is desirable to minimize this probability which determines the number of bits transmitted and prevents further reductions in the length of the transmit burst.

A digital data modulator that can produce any desired modulation is described, for example, in U.S. patent application Ser. No. 08/305,702, entitled "Quadrature Modulator with Integrated Distributed RC Filters" and filed on Sep. 14, 1994, which is incorporated here by reference. Such techniques may be economic candidates for use in a pager if integrated into a single, combined transmit/receive chip as previously referred to. Alternatively, a simpler modulation technique called constant-envelope OQPSK may be employed without use of such a modulator chip and formed within frequency synthesizer 35 instead, as will now be described.

FIGS. 5(a)–5(c) show signal diagrams for constant envelope OQPSK modulation. The radio signal's complex vector value is constrained to move only around the constant radius circle of FIG. 5(a) and undergoes eight types of transitions associated with even and odd bit periods.

In even bit periods, the bit information bit carried by the I bit is static while the information bit carried by the Q bit either remains the same or changes. Since the I bit can be static at 0 or 1 and the Q bit can be static at 0 or 1 or change from 0 to 1 or 1 to 0, this defines eight possible signal waveform transitions for even bit periods. The Q waveshape during a transition is however independent of whether the I bit is a 0 or a 1, so there are four possible Q waveforms over the period which are illustrated in FIG. 5(b).

In odd bit periods, the Q bit is static at 0 or 1 while the I bit either transitions from 0 to 1 or 1 to 0 or remains unchanged. This leads to four possible trajectories for the I signal to take over an odd period as shown in FIG. 5(c). Since the sum of the squares of I and Q is at all times equal to the constant radius of the circle, when I changes sign it goes through zero and Q rises from a magnitude of 1/root(2) to unity at that moment. Likewise, if Q changes sign, passing through zero, the magnitude of I rises to unity at the instant Q passes through zero in order that the sum of the squares remains unity.

The OQPSK signal can be decoded by using a matched filter which correlates received I and Q waveshapes received with expected waveshapes for different bit sequences and picks the sequence having the closest correlation. However, the method of sampling the I waveform in the middle of even bit periods and sampling the Q waveform in the middle of odd bit periods may be used, the signs of the samples yielding the data information carried by the modulation.

Figure 10:
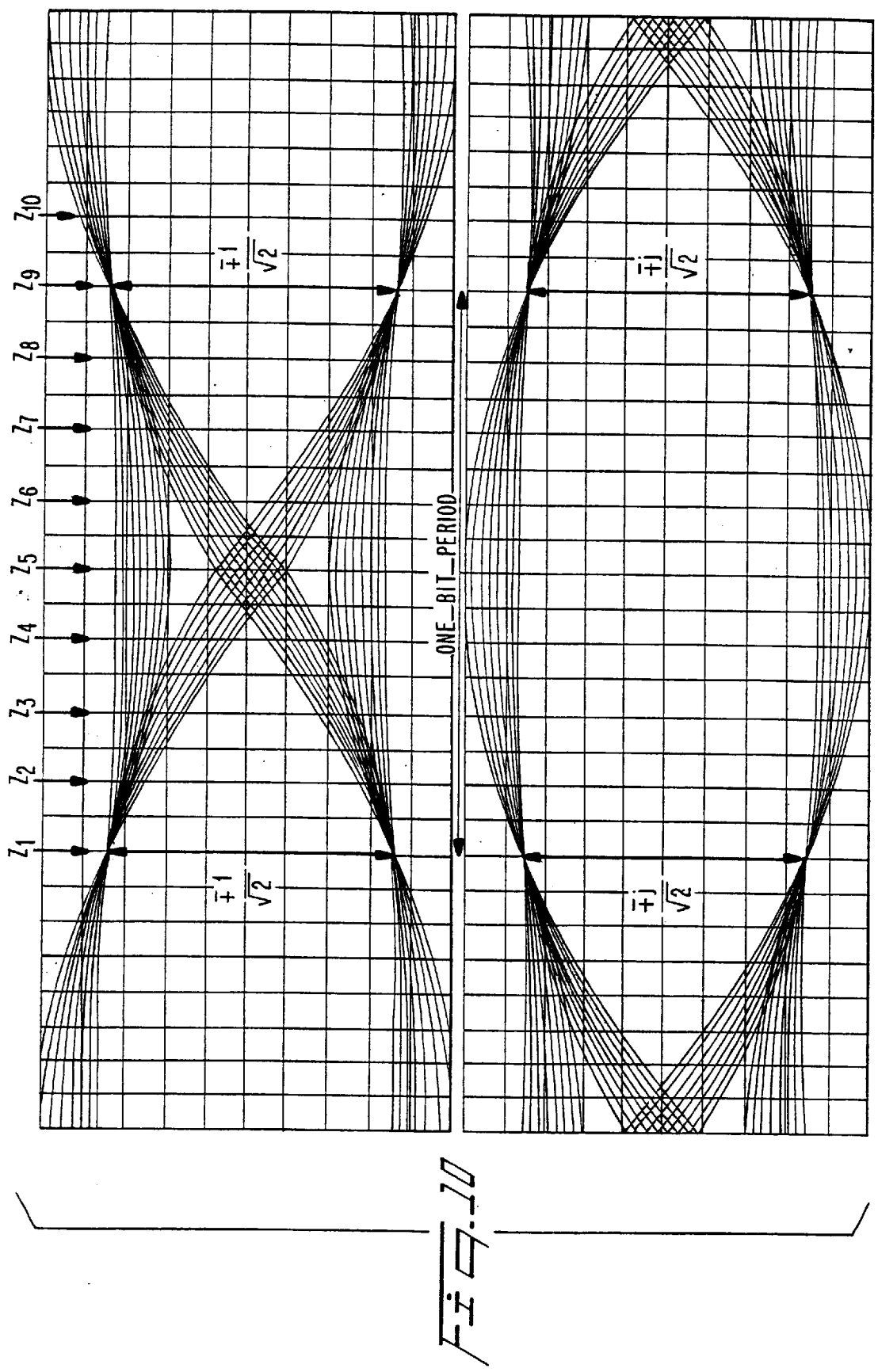
FIG. 10 depicts the constant envelope OQPSK which has been Nyquist phase filtered.

Since the amplitude (represented by the radius of the circle in FIG. 5(a)) of the signal remains constant, only the phase angle of the vector changes and this can also be equated to a frequency modulation waveform through the relationship that an instantaneous frequency shift is equal to the rate of change of phase. Converting the I,Q waveforms to phase waveforms using an ARCTAN function and then differentiating those waveforms yields the frequency modulating function. The frequency modulation waveform has three important values of −B/4 corresponding to a clockwise phase change through 90 degrees over a bit period, +B/4 corresponding to an anti-clockwise phase change through 90 degrees over a bit period, or zero corresponding to two consecutive like I bits and two consecutive like Q bits giving rise to no phase change over a bit period. The frequency modulating waveform composed of these three values is then applied to a low-pass filter to smooth transitions and thus improve the spectral containment of the signal energy within an allotted radio channel. A suitable filter can, for example, be a raised cosine Nyquist filter with an additional X/sin(X) term for waveform shaping in the frequency domain. The provision of an additional 0/sin(X) term is due to the phase change over a bit period being the integral of the frequency waveform over a bit period, which mathematical operation is equivalent to a sin(X)X filter. Thus, if the frequency waveform is filtered by a Nyquist filter, the phase waveforms will have been filtered by a Nyquist filter plus an additional sin(X)/X filter waveform. The additional sin (X)/X filter is thus removed by applying the inverse, i.e. an X/sin(X) filter, leaving the phase Nyquist filtered waveform. Nyquist filtering of the phase results in the phase passing through the points (+i+j) at bit-period intervals, as shown in FIG. 10 which is described in more detail below.

Figure 11:
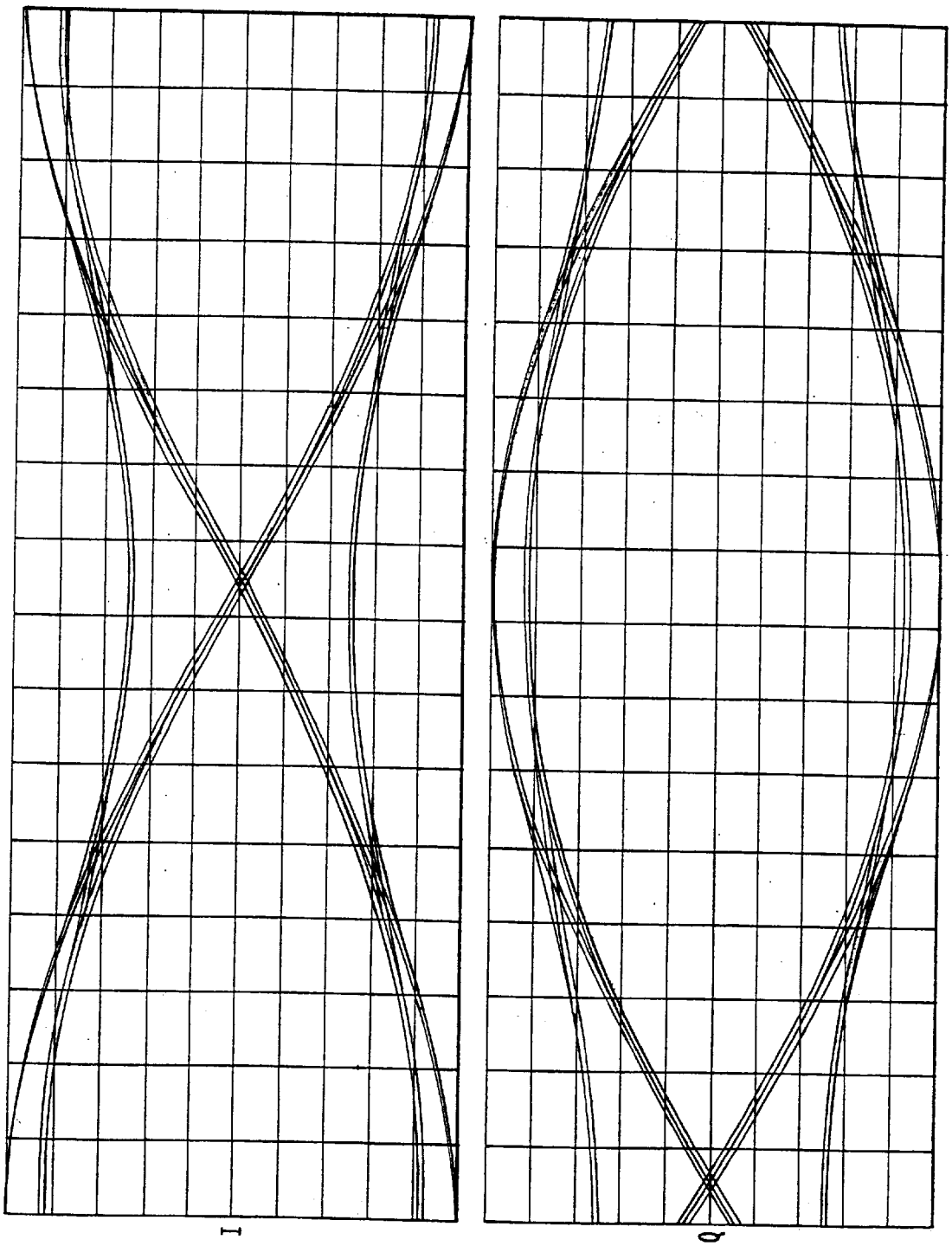
FIG. 11 depicts a GMSK waveform.

The waveforms produced by this modulation are closely related to the waveforms produced by other constant envelope modulations such as Gaussian Minimum Shift Keying (GMSK), which modulation scheme has been specified for the Pan-European GSM digital cellular system. A GMSK waveform is shown for comparison in FIG. 11 which is also described in more detail below. Of course, any type of modulation scheme can be used to implement the present invention.

After low-pass filtering, the frequency modulating function is a continuous waveform. Frequency modulation with a continuous waveform may be carried out by applying the waveform to a voltage controlled oscillator (VCO). When the modulation sensitivity of the oscillator is not exact, however, the rate of change of phase created will not be exact and thus the phase will rotate too much or too little over a bit period, causing the phase to gradually deviate from the desired information-representative values. Another problem is that frequency synthesizer 35 will attempt to correct any frequency changes that the modulation makes to the VCO's frequency causing another source of error.

These problems may be solved using two-point modulation of the frequency synthesizer in which modulation is applied to the VCO and at the same time control bits are applied to the synthesizer logic to indicate whether the modulation is demanding a +B/4, −B/4 or zero rate of change of phase. In this way the synthesizer control loop is prevented from fighting the modulation and instead cooperates to effect the desired phase changes. For example, a fractional -N synthesizer of the type disclosed in U.S. Pat. No. 5,180,993, which disclosure is incorporated here by reference, can be used. Next, the base station receiving network's detection of replies from the low-power pagers according to exemplary embodiments of the present invention will be discussed.

FIG. 6 illustrates an exemplary vertical collinear array of patch antennas for providing vertical beamwidth compression as well as about 5 dB of azimuthal directivity. The dimensions illustrated are, of course, exemplary. Dual-polarized patch antennas are printed on long printed circuit boards together with stripline phasing and coupling lines. Each patch 60 operates against a rear ground plane and an optional plane (illustrated by dotted lines in FIG. 6) of printed director patches (not shown) may be mounted in front of the driven patches to increase directive gain and narrow the beamwidth.

Each such collinear array thus provides two outputs, for example, an output corresponding to a left-hand circularly polarized received wave and an output corresponding to a right-hand circularly polarized wave. Low-noise preamplifiers together with bandpass filters to reject strong out-of-band interfering signals may be contained on the printed circuit board close to the array elements, to reduce line losses. The complete assembly is enclosed in a radio-transparent, weatherproof tube 59.

FIG. 7 shows more details of the internal connections between antenna elements to form the collinear array. A patch 60 can be fed off-center at two places, i.e., those connected to lines 66 and 67, spaced by 90 degrees relative to the center to provide orthogonal linear polarizations. Quadrature coupler 61 couples the two linearly polarized signal outputs to form circularly polarized signal outputs. Bandpass filters 62 and 63 reject unwanted signals that may desensitize low-noise amplifiers 64 and 65, such as a strong nearby paging transmitter operating on a different frequency.

FIG. 8 illustrates part of a suitable receiver signal processing channel which may be connected to either of the preamplified outputs of the antenna of FIGS. 6 and 7. A further bandpass filter 70 can be provided, if necessary, to attenuate unwanted signals and precedes image-rejection amplifier/mixer chip 71. The chip 71 uses an externally supplied first local oscillator (LO) frequency to downconvert received signals to a first intermediate frequency (IF). The first LO is common to all receiver channels to preserve a fixed phase relationship between the first IF outputs. The first IF signal is then filtered in IF filter 72 to impose a channel bandwidth optimum for receiving replies from the pagers. Further amplification and a second downconversion using a common second LO takes place in IF chip 73. A suitable IF chip is, for example, the SA637 manufactured by the Philips company, formerly known as Signetics in the USA. The IF chip 73 has two second IF amplifier blocks and provision to insert second IF filters 74 and 75 between them to improve selectivity against adjacent channel signals. The IF chip also provides a hardlimited second IF output, and a signal proportional to the logarithm of the instantaneous signal amplitude known as RSSI. These output signals are fed to logpolar digitizer 76 which functions, for example, according to the disclosure in U.S. Pat. No. 5,048,059 entitled "Logpolar Signal Processing", which is incorporated here by reference. The logpolar digitization method provides a sequence of numerical samples that represent the received signals complex vector value at sequential time instants. The numerical samples include bits that represent the instantaneous phase angle of the vector and bits that represent the logarithm of the amplitude. As will be seen, this format is particularly attractive for applying phase rotations and amplitude scings to the outputs of different antennas for the purpose of signal combining to enhance directivity of reception. The receiving chain of FIG. 8 can also be included on the printed circuit board of the antenna array and housed within the weatherproof tube. The output from the antenna in this case would be a digital stream of complex numbers in logpolar format representing a left hand circular polarized wave and another stream representing right hand circular polarization. The two streams could also be multiplexed into one stream to save wires, and even conveyed by optical fiber to a central processing point which may be located at the bottom of the antenna mast. FIG. 9 shows, for example, eight such collinear arrays 80 disposed at equal angular intervals around a mast, their output logpolar streams being connected to a central signal processing unit 81. In practice, a larger number of arrays such as 16, 32 or 64 may be used.

When a signal wavefront impinges on the array from a particular direction, different ones of the collinear antennas 80 will receive the signal at different strengths depending on the angle of arrival relative to their beam-entre directions, and at a different relative phase that depends on the angle of arrival and the position of the antenna. A feature of the present invention is that the individual signal processing channels, such as those shown in FIG. 8 do not have to be phase matched. Whatever hase differences exist between channels there will be a unique set of relative phases and amplitudes of the signals received by different antennas for each possible direction of arrival. By determining these characteristic relative phases and amplitudes adaptively, the signal processing unit 81 learns how to combine the signals from each antenna with others in order to enhance reception in any and all directions. The way in which this adaptive learning takes place will be described later.

Typically, if each antenna already has a restricted azimuthal beam pattern, for example being insignificant outside of a 120 degree sector, then only one third of the antennas will significantly receive a signal from a given direction. For example, antennas 1, 2 and 3 may significantly receive a signal from due North (i.e., 0 degrees); antennas 2, 3 and 4 a signal from North East; antennas 3,4 and 5 a signal from East, and so on, in the case of an eight-antenna system. To enhance reception from, for example, the North, the signals from antenna signal processing chains 1, 2 and 3 should be combined in phase.

Each signal comprises a stream of logpolar complex samples comprising a logamplitude L(i) and a phase PHI(i). The phase values are integer binary numbers of, for example, eight bits length, and the integer values wrap-around when modulo 256 arithmetic is used in the same way as phases add or subtract in modulo $2\pi$ fashion. The phase of a signal may be changed therefore by byte-wide addition of an adjustment value THETA(L) to PHI(i).

Multiplicative amplitude scaling also simplifies to integer subtraction of a scaling value S(i) from the logamplitude L(i) in the logarithmic domain. To form a phased and weighted version of signals 1, 2 and 3 for summing, the signal processing unit thus forms:

L(1)-S(1); PHI(1)-THIIA(1)
L(2)-S(2); PHI(2)-THETA(2)
L(3)-S(3); PHI(3)-THiETA(3)

using simple integer binary subtractors.

These modified logpolar complex numbers are then converted to Cartesian form with the aid of antilog and cos/sin lookup tables, discussion of which may be further found in the aforementioned U.S. Pat. No. 5,048,059. Having transformed the modified logpolar values above to Cartesian complex form X(i)+jY(i), the sum X1+X2+X3; Y1+Y2+Y3 is formed and represents an enhancement of the signal received from a particular direction determined principally by the choice of phasing values THETA(i).

According to the present invention, the signal processing unit maintains a matrix of phasing and scaling values in an electronic memory (e.g. a RAM chip) corresponding to many different possible directions of arrival. Denoting one pair of phasing and scaling values (L(i); THETA(I) by V(i,j) where j indicates association direction number j, such a stored matrix is of the form:

| | |
|---|---|
| V11, V21, V31, 0, 0, 0, 0, 0 | N |
| | NNE |
| 0, V22, V32, V42, 0, 0, 0, 0 | NE |
| | ENE |
| 0, 0, V33, V43, V53, 0, 0, 0 | E |
| | ESE |
| 0, 0, 0, V44, V54, V64, 0, 0 | SE |
| | SSE |
| 0, 0, 0, 0, V55, V65, V75, 0 | S |
| | SSW |
| 0, 0, 0, 0, 0, V66, V76, V86 | SW |
| | WSW |
| V17, 0, 0, 0, 0, 0, V77, V87 | W |
| | WNW |
| V18, V28, 0, 0, 0, 0, 0, V88 | NW |
| | NNW |

In the above matrix, the null value 0 indicates that there is no value in that position as opposed to the values being zero. The band matrix form with interspersed null elements is due to only three antennas contributing significantly to receiving from the given direction. Of course those skilled in the art will appreciate that antennas could be more or less densely provided or could have a more or less restricted azimuth so that more or fewer than three antennas could receive significant signal components from a source. Only rows corresponding to eight points of the compass are shown above for brevity, however, intermediate directions, such as WNW, would have corresponding rows and could have four non-null entries.

One such phasing and scaling table is provided for each of the two orthogonal polarizations. Since the relation between the different polarizations can not be predicted in advance due to the arbitrary orientation of the pager's antenna, as well as unknown effects of the proximity of the user's body, it will be described later how received signals from each polarization are processed together non-coherently.

The signal processing unit 81 receives a timing synchronization signal from the paging transmitter control unit (not shown) that triggers the signal processing unit to record logpolar samples in memory from each antenna and polarization during a predetermined window. Offline, the processor 81 then uses the above stored phasing and scaling matrices to combine the signals from antennas corresponding to left hand circular (LHC) polarization successively in all the different ways corresponding to different hypothetical directions of arrival of a reply from a pager. In parallel, corresponding combinations are formed for RHC polarization. The sequences of combined samples for both polarizations and a particular direction at a time are then processed to try to detect the presence of a reply from a pager received from that direction. The method of searching for such a reply involves further hypothesizing the exact time of arrival and this will now be elaborated with reference to FIG. 10.

FIG. 10 shows the constant-envelope, OQPSK waveform of FIG. 5, which is used in this example to illustrate transmissions from the pager. FIG. 10 indicates a number of sampling instants used by the receiver chains of FIG. 8 for digitizing the received complex signal vector. The AtoD convertor 76 is assumed to sample and digitize the signal vector at the rate of, for example, eight samples per bit period, and successive samples are numbered Z1, Z2 . . . Z10. Samples beyond Z10 have not been illustrated in FIG. 10.

This complex sample sequence is then decimated into a number of bit-spaced sample sequences each comprising one sample per bit period, i.e.

| | | | | |
|---|---|---|---|---|
| Sample phase 1: | Z1 | Z9 | Z17 | Z25 . . . |
| Sample phase 2: | Z2 | Z10 | Z18 | Z26 . . . |
| Sample phase 3: | Z3 | Z11 | Z19 | Z27 . . . |
| Sample phase 8: | Z8 | Z16 | Z24 | Z32 . . . |

Since the reply expected from the pager is known, if Zi is indeed the sample corresponding to the +/−1, +/j points of FIG. 10, then it is known which of the four complex values should be received. Supposing this value is (−1+j )/root(2), corresponding to a phase angle of 135 degrees, then Z1 is rotated through −135 degrees by complex multiplication of that sample with exp(−π/4) to give an expected value of 1. This is done successively for all points Z9,Z17 ... etc. belonging to the same sample phase, and using the corresponding known data bit pair for that point, the rotated complex values being accumulated together to form a complex correlation value. Since the rotated value is expected to be 1 in every case, the expected correlation value is simply N, where N is the number of samples added.

In practice, transmission through the neither causes an unknown phase shift ALPHA, so that the correlation value will not be N but N.expGALPHA). The angle of the complex result yields the angle ALPHA of the unknown transmission phase, while the magnitude determines how well the received waveform of sample phase 1 matched the expected response. The calculation is also repeated for the same sample phase and corresponding samples from the opposite polarization, and the magnitudes of the results for each polarization are added. This process is then repeated for all sample phases due to the uncertainty that sample phase 1 represents the correct timing. The number of sample phases for which correlation values using signals received from each polarization should be computed depends on the time-of-arrival uncertainty. For example, if the pager can be at any distance from 0 to 30 kM from a base station, the round trip delay can have a propagation time uncertainty of 0 to 200 μS. If bits are transmitted at 32 KB/s (30 μS bit periods) then the time-of arrival uncertainty is approximately 7 bit periods or 56, ⅛th-bit samples. The above calculation should thus be repeated with 56 sample phases. Moreover, the calculation of all 56 sample phases is repeated for all possible directions of arrival, that is, by combining the signals from the antenna elements using each row of logpolar combining coefficients in turn. Due to the matrix combination being a linear operation, it can be advantageous to apply the angular rotations needed for the complex correlation process to the logpolar values output by receiver chains of FIG. 8, while the signals are still in the logpolar format and angular rotation is simply performed by integer addition to the phase values. The derotated value sequences are then combined using the coefficient matrix to produce correlation results, one per sample phase, from which the known data modulation has been removed by the derotation process. The magnitude squared of a result for one polarization is then added to the magnitude squared of a corresponding result for the other polarization to yield the polarization-diversity combined correlation result for a given direction of arrival and time-of-arrival. If the result for a particular direction and time of arrival exceeds a threshold, then a reply from the pager is deemed to have been detected. The threshold is determined with regard to values produced with incorrect directions or times of arrival or when noise alone is known to be present, such that the probability of a false detection is remote.

It will sometimes be desirable to transmit more information from the pager than a simple acknowledgment. A variation of the present invention includes allowing the pager to reply to a page using either a first code or a second code, the codes being chosen to be maximally different, e.g. orthogonal codes. The base receiver then performs the above correlation process using both codes and whichever yields the largest correlation is deemed to be that transmitted. If a first coded is detected, it can signify for example that the response is a simple, acknowledgment; if the alternate code is detected however, it can be used to signify that other information follows. According to another aspect of the invention, the base receiving system may in that instance continue to process further samples collected in memory from the receiver chains of FIG. 8, but using now the single set of matrix combining coefficients corresponding to the detected direction of arrival, the sample phase detected to yield the time of arrival, and the magnitudes of the corresponding correlations produced for each polarization to determine a single way of combining the antenna element signals during the further processing, in order to extract other information transmitted by the pager. Third and additional codes could also be provided to indicate other replies from the pager. Next, an exemplary way in which the table of logpolar combining coefficients is adaptively learned will be described.

It will be appreciated that not all pagers will lie at some maximum range from a base station and that over the course of even one day many replies from locations distributed all over the service region will be processed. Many of these will be from locations so close or favorable from a radio propagation viewpoint that replies can be detected without the extra, for example, 15 dB of directivity afforded by combining many collinear array signals together. The present invention may also therefore comprise signal processing of non-combined signals from each colinear array, using only polarization combination and time-of-arrival testing but without direction-of-arrival testing. Those responses detected in this way are then used to associate the correlation phases and amplitudes from each individual collinear array with that particular direction. Since the relative phases and amplitudes corresponding to any particular direction can be predicted knowing the antenna geometry, apart from any phase or gain mismatches between the receiver channels of FIG. 8, this allows re-estimation of the gain and phase mismatches, which may thus be updated every time a pager acknowledgment is detected. Using replies detected without the extra directive gain allows convergence of the learned coefficients even from a poor starting approximation, but once reasonable values have been learned, even replies detected using the array gain can be processed to determine if the coefficients had drifted slightly, and might be adjusted. The mathematics involved in such mobile assisted array calibration procedures may be formulated by a person of normal skill in the art as guided by the disclosures in the parent applications. Such mathematical operations may be performed offline by a low-cost microprocessor or other suitable computer as the array components are not expected to change characteristics rapidly. Since the system does not necessarily know whether incoming signals can be processed in an uncombined manner, it could, for example, first look for pager replies on each uncombined antenna signal and, if no reply is detected, then process the signals in the combined manner described above. Since the received signals are stored in memory, this iterative process can be readily accommodated.

Using the above described invention, it is disclosed how collinear arrays of antennas having a reduced beamwidth in elevation and corresponding directive gain limited only by the vertical stacking dimension can be constructed. Moreover, such antennas can have a reduced beamwidth in azimuth (for example 120 degrees) and a corresponding additional directive gain of 5dB for example. Finally it has been revealed how a circular disposition around a mast of a number of such collinear antennas, for example 32, can be used to obtain an additional directive gain of for example 9 dB, by combining for example the 11 antennas in any 120 degree sector together using a logpolar coefficient matrix. Finally, at least a 3 dB further gain is achieved by using both polarizations, and thus avoiding the 3dB or more polarnztion loss that normally is allowed for when the pager antenna is arbitrarily orientated. The total gain of about, for example, 17 dB compared to a paging transmitter antenna of the same vertical aperture, but omnidirectional in azimuth, allows at least a 50:1 reduction in transmitter power in the reverse direction of pager to base transmission. By forming 32-bit correlations at the base receiver using the known, expected bit pattern of a pager reply, a further gain is obtained relative to transmitting bit-wise information in the forward direction. The present invention thus provides the possibility of reliably detecting replies from pagers that transmit very short bursts, for example, of only 1 watt RF power over paths that require, for example, 100 watts or more for communication in the forward direction.

A further capability provided by the present invention is to convey correlation values calculated at several different base receiving points to a central processing point and to combine the squared magnitudes of correlations from different base receivers. The correlation values from different bases that are combined should correspond to time-of-arrival and direction of arrival hypotheses consistent with the same hypothesis of pager location. The triangular region bounded by three base sites can, for example, be divided into a number of smaller regions, for example hexagonal cells, of dimension corresponding to one, ⅛h-bit sample delay, that is for example 4 $\mu$S or 1.2 kM across. If the base sites are, for example, 60 kM apart, the triangular region bounded by them will comprise roughly 1600 such smaller regions. The pager can be postulated to be located in each of these smaller cells in turn and the direction of arrival and relative time of arrival at each site predicted. This will determine which DOA/TOA-corresponding correlations from one site should be combined with those of another site in order to detect the pager's signal. In practice, since pagers located near one or another site would be expected to be strongly received using that site alone, not all possible locations will need the benefit of multiple-site reception to enhance pager signal detection. An example of this aspect of the present invention will now be presented with reference to FIG. 12.

FIG. 12 shows an exemplary scenario comprising a triangular service region 123 bounded by base station sites 1, 2 and 3 respectively; region 234 bounded by base station sites 2, 3 and 4, and so on. These relatively large triangular regions, e.g., on the order of tens of kilometers on a side, are imagined to be divided into smaller regions or "cells" of perhaps 1 kilometer in diameter as typified by the cell marked "X" in region 123.

If the network pages a particular unit and wishes to test the hypothesis that a reply was received from that unit and that the unit is currently located in cell X, it can be seen that the network will expect the reply to be received at base 1 from the direction SSE+5 degrees and since the distance is also known to be between 19 and 20 kM one way, the exact time-of-arrival can be predicted with a loop delay uncertainty of, for example, +4 $\mu$S or +⅛th of a symbol period, due to the inventive pager's feature of accurately timing transmission of an acknowledgment relative to receipt of a correct address. Likewise, the directions of arrival and relative times-of-arrival at bases 2 and 3 can be predicted, so that signals received respectively at bases 1, 2 and 3 by different antenna array elements and processed into memory, can first be subject to combining the signals from the antenna elements of the same site and polarization using the postulated direction of arrival at that site. Then, after correlation with the expected acknowledgment code with a time alignment for each site derived from the postulated time-of-arrival at that site, the magnitudes of the correlations obtained at different sites and with different polarizations are added to obtain a composite correlation value using the signals received at all sites. This may be repeated using other codes such as a code indicating further data was transmitted and one or more orthogonal codes or dummy codes to obtain a threshold value, and the composite magnitudes compared against the threshold value to determine if the acknowledgment was received, the message flag was received, or no reply was received. An alternative way of determining a threshold against which correlations are compared is to add the magnitudes of the received signal samples correlated with the acknowledgment code, this yielding the largest possible correlation that could be achieved. If the actual correlation is not too far below the maximum, the acknowledgment is deemed to have been detected. A person skilled in the art will be able to carry out computer simulations to predict the probabilities of correct detection, missed detection and false detection at various signal to noise ratios with different choices of the detection thresholds mentioned above in order to determine optimum values according to his specification criteria.

Using the technique disclosed above of hypothesizing pager location, the number of direction-of-arrival hypotheses times the number of time-of-arrival hypotheses which have to be made is reduced while at the same time obtaining the benefit of multiple receiver site detection. This benefit is obtained by passing signals received into memory at more than one site to one or more common processing points. For example, all signals received at all sites could be forwarded to a common signal processing node in the network. Alternatively, in the interests of network homogeneity, each site could contain signal processing and could receive signals from all its nearest neighbor sites for the purpose of executing the above location hypothesis-testing algorithm. Thus according to this aspect of the invention, a reduction in processing, the benefits of multi-site detection and the approximate location of the replying unit are accomplished. Once the location has been established, if more information is to be forwarded to the unit, the network is able to choose the best base station transmitter for this purpose or even utilize two or more transmitters to effect a diversity transmission to enhance probability of correct reception. Diversity transmission of digital data is accomplished according to the best known art by employing a deliberate time offset between multiple transmitters such that their signals are received with a time offset of one or more whole digital data symbol periods at the receiver. The receiver then preferably employs a Viterbi equalizer to combine the signals from the transmitters. This scheme can be hard to implement in, for example, digital cellular systems, which do not normally compute the mobile unit's position, and therefore do not know the propagation delays from each transmitter to the mobile receiver. Using the above-described exemplary embodiment of the present invention, however, the network specifically derives the mobile pager unit's position or time delay from each transmitter and so is able to use this information to control the time offsets of a multi-site diversity transmission in an optimum manner.

The processing described above makes use of complex signals in logpolar format which is particularly suited for implementing the processes described in simple digital logic chips adapted for fast, short word-length digital arithmetic. Such chips can be constructed as Application-Specific, Integrated Circuits (ASIC) and according to one aspect of the invention an ASIC chip is disclosed to be suitable for making use of logpolar signal processing to combine radio signals from the elements of an antenna array in order to enhance directivity. Such a chip can form these combinations very rapidly and can thus sequentially form combinations corresponding to many different directions of reception. Such a chip is called a beamformer, and the preferred implementation is called a logpolar beamformer, although other implementations are possible using digital signal processors that can perform complex multiplications between numbers in Cartesian representation.

The novel two-way paging system disclosed herein is moreover not restricted to being able to detect a reply from a single pager at a time. The beamformer and correlation processes described above can be programmed to search for a first code expected to be received from a first pager and a second code expected to be received from a second pager. Whichever is detected at the highest correlation level is noted first and its contribution to the signals from each collinear array, as indicated by the partial correlations may then be subtracted before continuing to search for replies on the same frequency from other pagers, thus applying the principles disclosed in U.S. Pat. No. 5,151,919 entitled "CDMA Subtractive Demodulation" which disclosure is incorporated here by reference, and it will be recognized by a person skilled in the art that the inventive correlation with a known code expected to be transmitted from a pager is analogous to despreading a CDMA signal using a designated access code, to which the incorporated patent is applicable. Even signals transmitted from different pagers using the same code and the same radio frequency can be distinguished by direction of arrival using the invention and separately coded, or alternatively jointly decoded when direction of arrival separation is inadequate, as disclosed in the parent applications.

The invention is suitable for use either when the portable paging unit is allocated a separate frequency band for transmission compared to reception, or shall use the same frequency band. The precise timing of acknowledgment or message transmission from the pager relative to signals received from the base network by the pager allow the network to accurately anticipate the timeslots in which signals will be received in the reverse direction, and the network can shut-off its own transmitters during those short timeslots to avoid interfering with its own receiving channels.

While the present invention has been described in terms of the foregoing exemplary embodiments, the present invention is capable of many variations and modifications apparent to one skilled in the art. AU such variations and modifications are deemed to fall within the spirit and scope of the invention as described in the following claims.

I claim:

1. A paging network having at least one paging transmitter and receiver site for transmitting paging messages and for receiving acknowledgments comprising:

a timing control unit for timing said paging transmissions and for activating receive processing channels;

a plurality of directive antennas coupled to associated receive signal processing means for receiving signals from respective antennas and converting said signals to corresponding complex numerical samples at times determined by said timing control unit;

a memory for storing said complex numerical samples; and digital beamforming and processing means for processing said complex numerical samples from each of a first plurality of antennas in a plurality of ways corresponding to different possible directions and times of arrival of said acknowledgments from a pluraliyt of said pagers in order to improve probability of detection of said acknowledgments.

2. A paging network according to claim 1 in which said plurality of directional antennas includes antennas responsive to received signals having different polarizations.

3. A paging network having at least one paging transmitter and receiver site for transmitting paging messages and for receiving acknowledgments, comprising:

timing control means for timing said paging transmissions and for activating receiver circuitry;

plural antenna means for favoring reception of signals from at least one of different directions and different polarizations;

wherein said receiver circuitry is coupled to each of said plural antenna means for filtering, amplifying and converting respective received signals to corresponding complex numerical sample sequences under control of said timing control means;

memory means for storing said complex numerical sample sequences;

digital beamforming means having a complex coefficient matrix for processing said stored complex numerical sample sequences to produce combined sequences each corresponding to reception from different directions;

correlation means for correlating each of said combined sequences with a predetermined signal pattern to produce correlation values for different shifts of each of said combined sequences corresponding to different time delays of a received signal; and comparison means for comparing each of said correlation values with others and with a threshold value in order to decide if an acknowledgment was detected from a particular direction and with a particular time delay and for producing a corresponding detection indication.

4. The paging network according to claim 3 further comprising:

message processor means for receiving said detection indication and for determining if a paging message shall be transmitted again based on said detection indication.

5. The paging network according to claim 3 further comprising:

message processor means for receiving said detection indication and for controlling transmission of further information to an acknowledging paging unit based on said detection indication.

6. The paging network according to claim 5 in which said message processor means controls said further information to be transmitted in a direction indicated by said detection indication.

7. The paging network according to claim 5 in which said message processor means controls said further information to be transmitted at a power level indicated by said detection indication.

8. The paging network according to claim 5 in which said message processor means controls said further information to be transmitted from a site indicated by said detection indication.

9. The paging network according to claim 5 in which said message processor means controls said further information to be transmitted from a selected site, in a selected direction, and at a selected power level as indicated by said detection indication.

10. A two-way paging network capable of transmitting short messages to and receiving short messages from portable paging units, comprising:

plural antennas connected to respective receive channel processing units which convert respective received signal samples to corresponding sequences of binary numbers related to sample phase and the logarithm of sample amplitude;

memory means for storing said phase and logamplitude-related numbers and a coefficient matrix;

arithmetic unit means for combining said stored phase and logamplitude-related numbers with said stored coefficients to produce sequences of combined complex numbers having a real and an imaginary part, each sequence representing an enhanced signal reception from a particular direction; and correlation means for correlating each of said combined sequences with a predetermined signal pattern and producing a signal detection and direction of arrival indication.

11. A paging network according to claim 10 which directs further information transmissions to a pager based on said direction of arrival indication determined from a response previously received from said pager.

12. A two-way paging network capable of transmitting short messages to and receiving short messages from portable paging units, comprising:

plural antennas connected to respective receive channel processing units which convert respective received signal samples to corresponding sequences of complex numbers;

memory means for storing said complex numbers and a complex coefficient matrix;

arithmetic unit means for combining said stored complex numbers with said stored complex coefficient matrix in order to produce combined sequences each representing signal reception from a particular direction;

correlation means for correlating each of said combined sequences with predetermined signal patterns and producing a signal detection and direction of arrival indication; and decoding means which is activated if said detection indication has a first value to further process selected ones of said combined sequences as indicated by said direction of arrival indication in order to decode a short message from a portable paging unit.

13. A two-way paging unit according to claim 12 in which said selected ones of said combined sequences correspond to a signal received with different polarizations from a given direction.

* * * * *